(12) United States Patent
Kobukata et al.

(10) Patent No.: US 9,579,962 B2
(45) Date of Patent: Feb. 28, 2017

(54) BATTERY PROTECTION STRUCTURE

(71) Applicant: Nissan Motor Co., Ltd., Kanagawa (JP)

(72) Inventors: Tsunehiro Kobukata, Kanagawa (JP); Makoto Funakoshi, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/032,684

(22) PCT Filed: Oct. 28, 2013

(86) PCT No.: PCT/JP2013/079157
§ 371 (c)(1),
(2) Date: Apr. 28, 2016

(87) PCT Pub. No.: WO2015/063839
PCT Pub. Date: May 7, 2015

(65) Prior Publication Data
US 2016/0250915 A1  Sep. 1, 2016

(51) Int. Cl.
*B60K 1/04* (2006.01)
*B62D 25/08* (2006.01)
*B62D 43/10* (2006.01)

(52) U.S. Cl.
CPC .............. *B60K 1/04* (2013.01); *B62D 25/087* (2013.01); *B62D 43/10* (2013.01); *B60K 2001/0416* (2013.01); *B60K 2001/0466* (2013.01); *B60Y 2306/01* (2013.01)

(58) Field of Classification Search
CPC ............... B60K 2001/0405–2001/0416; B60K 2001/0466; B60K 1/04
See application file for complete search history.

(56) References Cited

U.S. PATENT DOCUMENTS

| | | | |
|---|---|---|---|
| 9,469,201 B2 * | 10/2016 | Hotta | B60L 11/18 |
| 2003/0098191 A1 * | 5/2003 | Takedomi | B60K 1/04 180/68.5 |
| 2008/0062622 A1 * | 3/2008 | Fukazu | B60K 1/04 361/678 |

(Continued)

FOREIGN PATENT DOCUMENTS

| | | |
|---|---|---|
| JP | 50-14117 U | 2/1975 |
| JP | 4023450 B2 | 12/2007 |
| JP | 2010-173363 A | 8/2010 |

*Primary Examiner* — Erez Gurari
(74) *Attorney, Agent, or Firm* — Osha Liang LLP

(57) ABSTRACT

A battery protection structure has a battery disposed in a vehicle cabin, a vehicle component disposed in the vehicle cabin to be located below the battery, and a protective member disposed between the battery and the vehicle component. The protective member has one end fixed to a vehicle body and another end arranged between the battery and the vehicle component to be thereby cantilevered on the vehicle body. The battery has a battery cell, and a battery case that houses the battery cell and has at least a lower surface facing the protective member. The protective member has a fixation portion formed at the one end and fixed to the vehicle body, and a contact portion formed at the other end and configured to come into contact with the battery case when load is inputted to the protective member.

3 Claims, 4 Drawing Sheets

(56) References Cited

U.S. PATENT DOCUMENTS

| | | | | |
|---|---|---|---|---|
| 2010/0273040 A1* | 10/2010 | Kubota | .................... | B60K 1/04 |
| | | | | 429/100 |
| 2010/0294580 A1* | 11/2010 | Kubota | .................... | B60K 1/04 |
| | | | | 180/68.1 |
| 2011/0011654 A1* | 1/2011 | Kubota | .................... | B60K 1/04 |
| | | | | 180/65.21 |
| 2011/0284299 A1* | 11/2011 | Takahashi | ................ | B60K 1/04 |
| | | | | 180/65.21 |
| 2012/0031695 A1* | 2/2012 | Tsuchiya | .................. | B60K 1/04 |
| | | | | 180/68.5 |
| 2012/0247855 A1* | 10/2012 | Mimura | ................... | B60K 1/00 |
| | | | | 180/216 |
| 2015/0060170 A1* | 3/2015 | Templeman | ........ | H01M 2/1083 |
| | | | | 180/68.5 |
| 2016/0250915 A1* | 9/2016 | Kobukata | ................ | B60K 1/04 |
| 2016/0297290 A1* | 10/2016 | Murata | .................... | B60K 1/04 |
| 2016/0297483 A1* | 10/2016 | Inagaki | ................. | B62D 25/08 |

* cited by examiner

BATTERY PROTECTION STRUCTURE

TECHNICAL FIELD

The present invention relates to a battery protection structure.

RELATED ART

Vehicles including motors in drive systems such as hybrid vehicles, electric vehicles, and fuel cell vehicles are conventionally known (for example, see Patent Literature 1).

In the vehicle described in Patent Literature 1, a battery and a spare tire are disposed in a rear portion of an inside of a vehicle cabin. Specifically, the battery is disposed behind a rear seat and the spare tire is disposed in a spare tire housing portion formed by recessing a floor panel behind the battery downward.

CITATION LIST

Patent Literature

Patent Literature 1: Japanese Patent No. 4023450

SUMMARY

However, in Patent Literature 1 described above, the spare tire is disposed behind the battery at a position below the battery to prevent the spare tire from interfering with the battery when load is inputted to the vehicle from the rear side as in, for example, rear-end collision. With such a design, the length of the vehicle in a front-rear direction is long, and the vehicle weight is great.

A battery protection structure according to one or more embodiments of the present invention may suppress an increase in a vehicle weight while protecting a battery when load is inputted to a vehicle from a rear side.

In a battery protection structure according to one or more embodiments of the present invention, a battery is disposed in a vehicle cabin, a vehicle component is disposed in the vehicle cabin to be located below the battery, and a protective member is disposed between the battery and the vehicle component. The protective member is cantilevered on a vehicle body.

The battery protection structure according to one or more embodiments of the present invention may suppress an increase in the vehicle weight while protecting the battery when load is inputted to the vehicle from the rear side.

DETAILED DESCRIPTION

Figure 1:
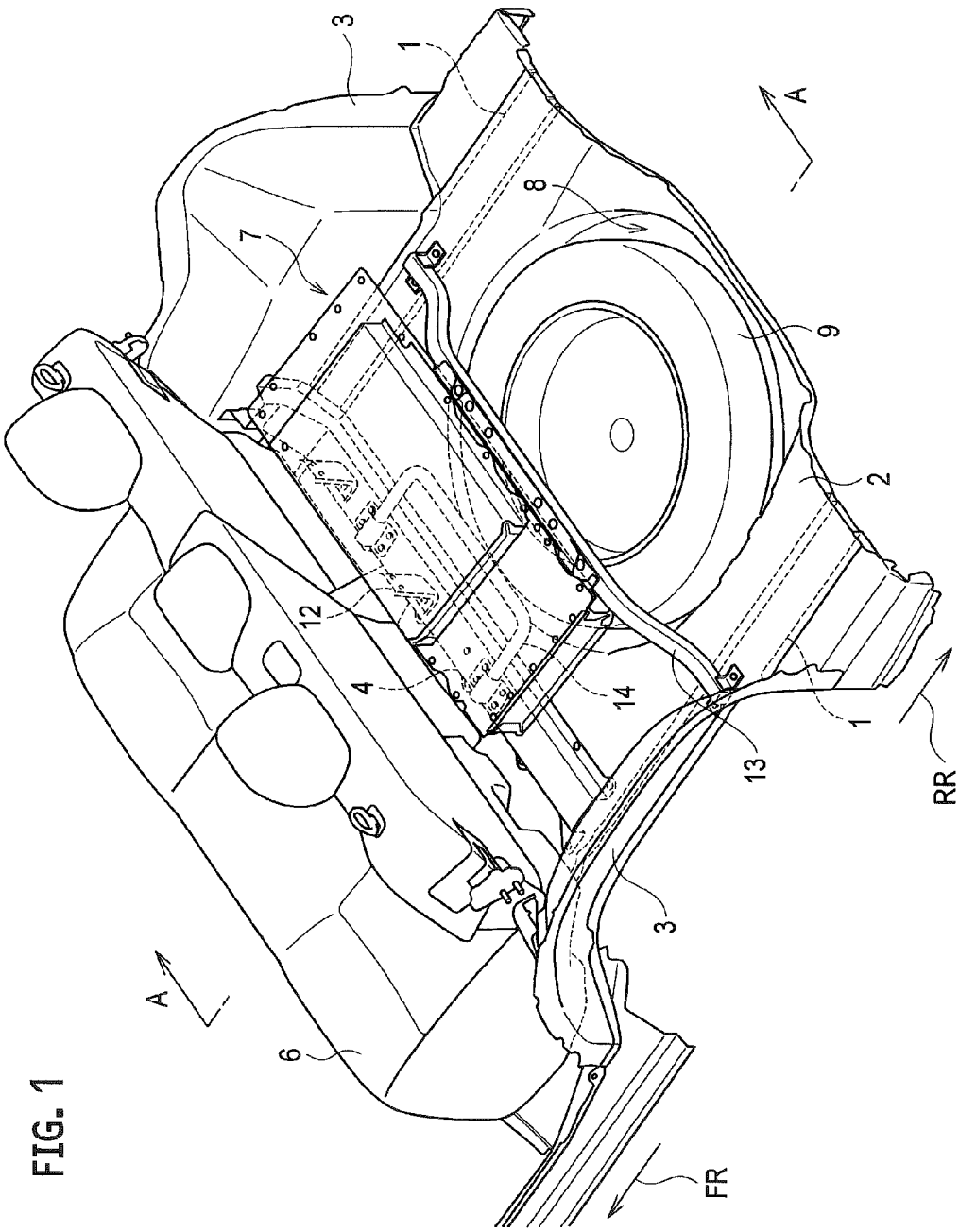
FIG. 1 illustrates a battery protection structure according to one or more embodiments of the present invention and is a perspective view of a state where a battery is installed.

Embodiments of the present invention are described below in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Note that a vehicle illustrated in the drawings is a vehicle including a motor in a drive system such as a hybrid vehicle, an electric vehicle, or a fuel cell vehicle. Moreover, in the drawings, the arrow FR indicates a vehicle front side and the arrow RR indicates a vehicle rear side.

Figure 2:
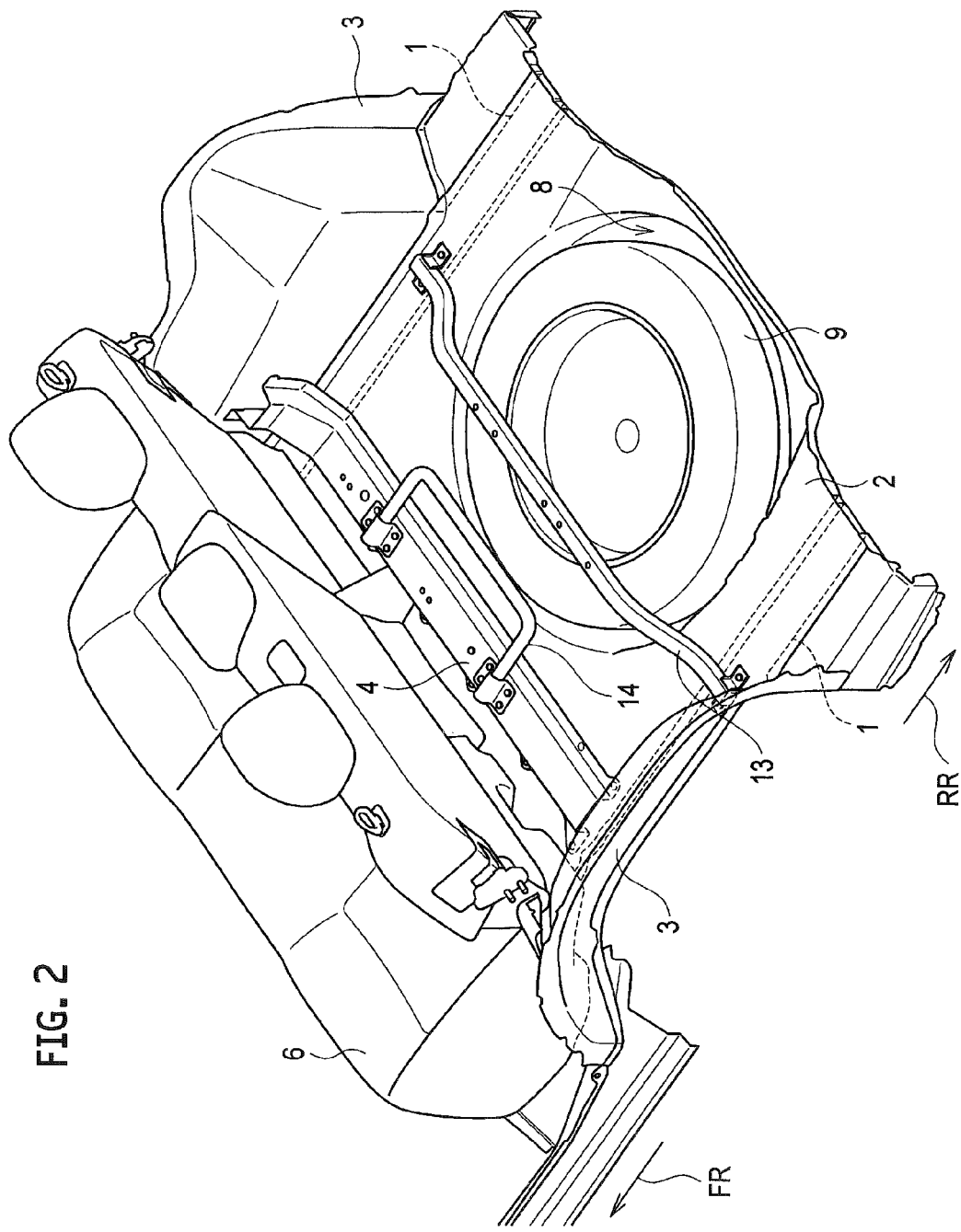
FIG. 2 illustrates the battery protection structure according to one or more embodiments of the present invention and is a perspective view of a state where no battery is installed.
Figure 3:
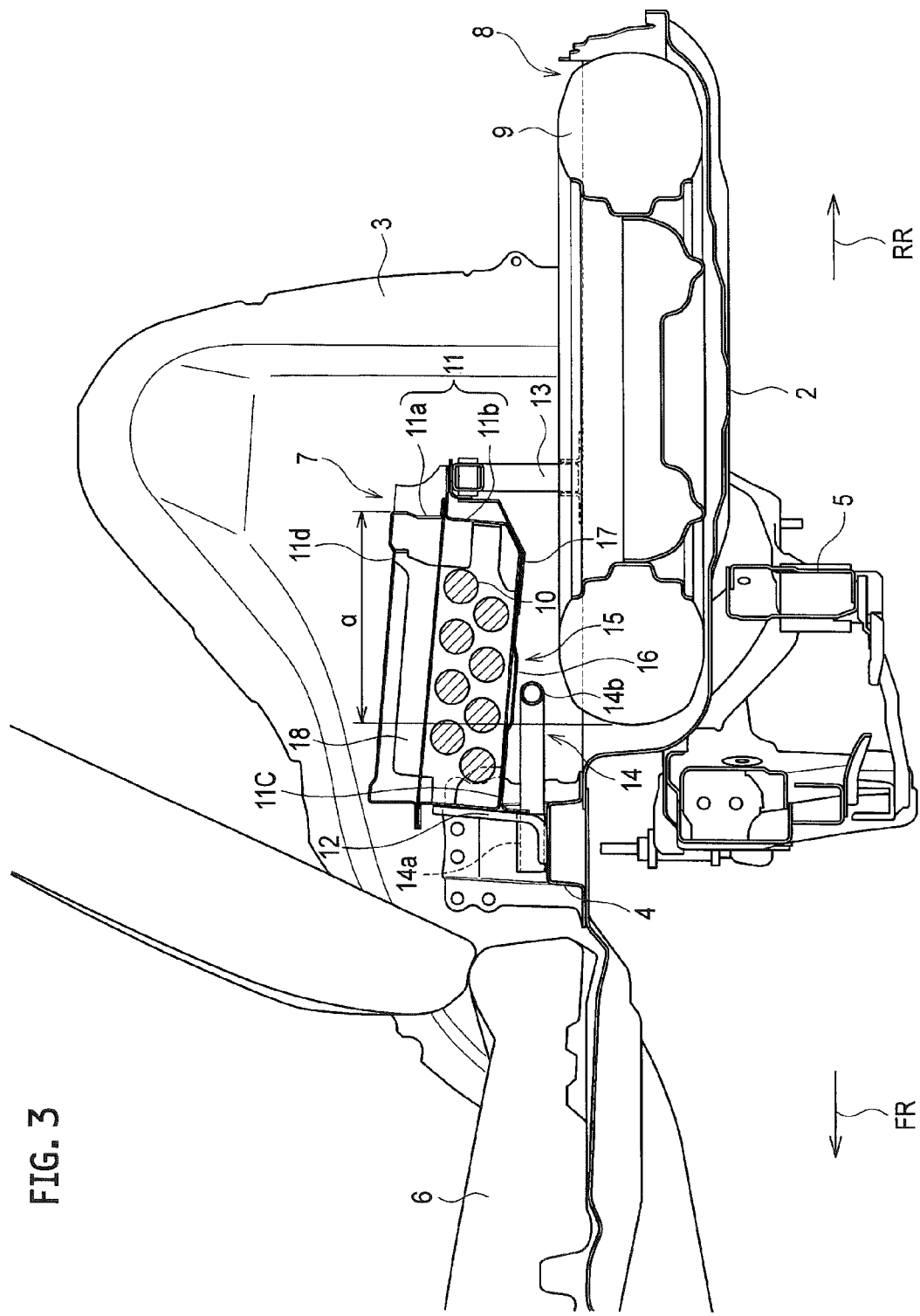
FIG. 3 is a cross-sectional view along the line A-A of FIG. 1.

As illustrated in FIGS. 1 to 3, paired side members 1, 1 are disposed in a rear portion of a vehicle body while being spaced away from each other in a vehicle width direction, and a floor panel 2 is laid on the side members 1, 1. Moreover, paired wheel well inners 3, 3 forming vehicle interior side surfaces of wheel wells are disposed on both sides of the floor panel 2 in the vehicle width direction, and a cross member 4 is laid between the wheel well inners 3, 3. Note that, in FIG. 3, reference numeral 5 denotes a rear suspension.

According to one or more embodiments of the present invention, a battery 7 is disposed on the vehicle rear side of a rear seat 6, and a spare tire 9 is disposed in a spare tire housing portion 8 formed by recessing the floor panel 2 below the battery 7 downward. Specifically, the battery 7 is disposed in a vehicle cabin and the spare tire 9 is disposed in the vehicle cabin to be located below the battery 7.

The battery 7 includes battery cells 10 and a battery case 11 housing the battery cells 10. Multiple battery cells 10 are housed in the battery case 11 and are connected, for example, in series. According to one or more embodiments of the present invention, the battery case 11 has an upper case 11a mainly housing a not-illustrated battery controller and the like and a lower case 11b mainly housing the battery cells 10 and the like. The lower case 11b has at least a lower surface 11c facing a protective member 14 to be described later.

The battery 7 (battery case 11) is supported by the cross member 4 and the floor panel 2 which are part of the vehicle body, via a front attachment bracket 12 and a rear attachment bracket 13. According to one or more embodiments of the present invention, the front attachment bracket 12 is made of a plate member having an L-shape in a side view, and is fixed to the cross member 4 by using bolts and the like. Moreover, the rear attachment bracket 13 is made of a rectangular pipe member having a shape of a hat in a front view, and is fixed to the floor panel 2 by using flanges, bolts, and the like.

The spare tire 9 is housed in the spare tire housing portion 8 provided in the vehicle cabin. Moreover, the spare tire 9 is fixed to the floor panel 2 by using a not-illustrated bolt and the like. Note that disposing the spare tire 9 in the vehicle cabin eliminates the need for equipment of a spare tire fixation device used to dispose the spare tire 9 outside the vehicle cabin, and can suppress increases in a vehicle weight and a manufacturing cost. Moreover, disposing the battery 7 and the spare tire 9 close to each other in an up-down direction in the vehicle cabin can suppress the height position of the battery 7 to a low level and secure a large luggage space.

As illustrated in FIG. 3, a gap is provided between the battery 7 and the spare tire 9, and the protective member 14 configured to protect the battery 7 from the spare tire 9 is disposed in this gap. The protective member 14 has one end fixed to the cross member 4 which is part of the vehicle body and another end arranged between the battery 7 and the spare tire 9 to be thereby cantilevered on the cross member 4. Specifically, the protective member 14 has fixation portions 14a formed at the one end and fixed to the cross member 4 and a contact portion 14b formed at the other end and configured to come into contact with the battery case 11 when load is inputted to the protective member 14. According to one or more embodiments of the present invention, the protective member 14 is made of a round pipe member having a U-shape in a plan view, and is fixed to the cross member 4 by using flanges, bolts, and the like. Note that, although the fixation portions 14a of the protective member 14 are fixed to the cross member 4 by using the flanges, the bolts, and the like in one or more of the above embodiments, the fixation portions 14a of the protective member 14 may be fixed to the cross member 4 by means such as welding.

Figure 4:
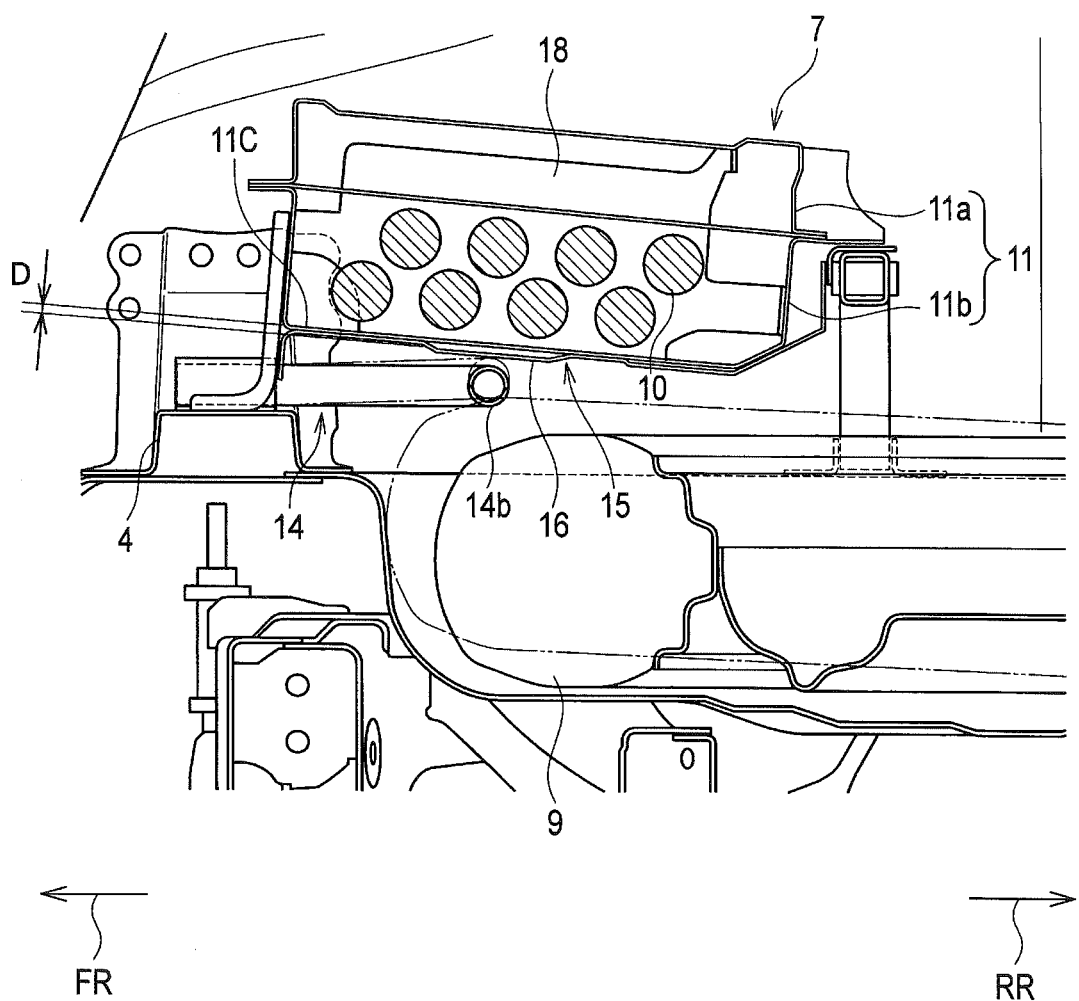
FIG. 4 is an enlarged view of a main portion of FIG. 3.

Moreover, a bulging portion 15 bulging from the lower surface 11c of the battery case 11 toward the spare tire 9 is provided in a portion of the lower surface 11c of the battery case 11 which is expected to come into contact with the contact portion 14b of the protective member 14, and a hollow portion is formed inside the bulging portion 15. As illustrated in FIG. 4, the bulging portion 15 has at least a bottom surface 16 facing the contact portion 14b of the protective member 14. According to one or more embodiments of the present invention, a panel 17 is laid on the lower surface 11c of the battery case 11 from below, and a bead provided in the panel 17 forms the bulging portion 15.

Moreover, a reinforcement plate 18 reinforcing the battery case 11 is disposed in the battery case 11. Specifically, the reinforcement plate 18 extends in the up-down direction from the lower case 11b to the upper case 11a of the battery case 11. Accordingly, a lower end of the reinforcement plate 18 is close to the lower surface 11c of the battery case 11, and an upper end of the reinforcement plate 18 is close an upper surface 11d of the battery case 11. Furthermore, the distance D (see FIG. 4) between the lower end of the reinforcement plate 18 and the bottom surface 16 of the bulging portion 15 is set to be greater than the distance (according to one or more embodiments of the present invention, the distance is zero) between the lower end of the reinforcement plate 18 and the lower surface 11c of the battery case 11.

Operations and effects of one or more embodiments of the present invention are described below.

(1) The battery protection structure according to one or more embodiments of the present invention includes the battery 7 disposed in the vehicle cabin, the spare tire 9 disposed in the vehicle cabin to be located below the battery 7, and the protective member 14 disposed between the battery 7 and the spare tire 9. The protective member 14 has one end fixed to the cross member 4 and the other end arranged between the battery 7 and the spare tire 9 to be thereby cantilevered on the cross member 4.

The protective member 14 is disposed between the battery 7 and the spare tire 9. When load is inputted to the vehicle from the rear side and the spare tire 9 moves toward the battery 7, the spare tire 9 hits the protective member 14 as illustrated in FIG. 4. The spare tire 9 thereby pushes the protective member 14, and load from the spare tire 9 is inputted to the battery 7 via the protective member 14. Accordingly, according to one or more embodiments of the present invention, the load inputted from the spare tire 9 to the battery 7 can be effectively reduced (Effect 1).

Since the protective member 14 is cantilevered on the cross member 4 which is part of the vehicle body, a deformation mode of the protective member 14 in the case where load is inputted from the spare tire 9 to the other end of the protective member 14 is a mode in which the protective member 14 turns about the one end fixed to the cross member 4. Accordingly, according to one or more embodiments of the present invention, it is possible to determine a portion where the protective member 14 and the battery 7 come into contact with each other when load is inputted from the spare tire 9 to the protective member 14, and the structure of the battery 7 can be optimized and refined (Effect 2).

The aforementioned effects 1 and 2 may enable the spare tire 9 to be disposed below the battery 7 in the vehicle cabin with the battery 7 being protected. Accordingly, the entire length of the vehicle can be reduced by setting a long overlapping length a (see FIG. 3) between the battery 7 and the spare tire 9 in a vehicle front-rear direction.

An increase in a vehicle weight can be thereby suppressed with the battery 7 being protected when load is inputted to the vehicle from the rear side.

(2) The bulging portion 15 bulging from the lower surface 11c of the battery case 11 toward the contact portion 14b of the protective member 14 is provided in the portion of the lower surface 11c of the battery case 11 with which the contact portion 14b of the protective member 14 comes into contact, and the hollow portion is formed inside the bulging portion 15.

When load from the spare tire 9 is inputted to the protective member 14 and the contact portion 14b of the protective member 14 comes into contact with the battery case 11, the contact portion 14b of the protective member 14 comes into contact with the bulging portion 15 provided on the lower surface 11c of the battery case 11 to crush the hollow portion inside the bulging portion 15. Thus, the load can be absorbed by the bulging portion 15 provided on the lower surface 11c of the battery case 11. Moreover, as described above, by employing a design in which the protective member 14 is cantilevered on the cross member 4 being part of the vehicle body, it is possible to determine a contact portion between the protective member 14 and the battery 7 in the case where load is inputted from the spare tire 9 to the protective member 14. In view of this, the bulging portion 15 is provided in the determined contact portion. The bulging portion 15 provided in the battery case 11 can thus absorb the load received from the protective member 14. Load input to the battery cells 10 housed in the battery case 11 can be thereby effectively suppressed.

(3) The reinforcement plate 18 extending in the up-down direction is disposed in the battery case 11, and the distance D between the lower end of the reinforcement plate 18 and the bottom surface 16 of the bulging portion 15 is set to be greater than the distance between the lower end of the reinforcement plate 18 and the lower surface 11c of the battery case 11.

When load from the spare tire 9 is inputted to the protective member 14 and the contact portion 14b of the protective member 14 comes into contact with the battery case 11, first the contact portion 14b of the protective member 14 comes into contact with the bulging portion 15 provided on the lower surface 11c of the battery case 11 to crush the hollow portion inside the bulging portion 15. Then, when the hollow portion inside the bulging portion 15 is crushed to some extent, the lower end of the reinforcement plate 18 disposed in the battery case 11 receives the load from the lower surface 11c of the battery case 11. Accordingly, the reinforcement plate 18 in the battery case 11 can receive and absorb load which is too great for the bulging portion 15 provided in the battery case 11 to absorb. Hence, load input to the battery cells 10 can be more effectively suppressed.

Although the present invention has been described with respect to a limited number of embodiments, the present invention is not limited to the above. Those skilled in the art, having benefit of this disclosure, will appreciate that other embodiments can be devised which do not depart from the scope of the invention as disclosed herein. Accordingly, the scope of the invention should be limited only by the attached claims. It is apparent to those skilled in the art that various modifications and improvements can be made.

For example, a vehicle component disposed in the vehicle cabin may be a vehicle component other than the spare tire.

REFERENCE SIGNS LIST

4 cross member (vehicle body)
7 battery
9 spare tire (vehicle component)
10 battery cell
11 battery case
14 protective member
15 bulging portion
18 reinforcement plate

The invention claimed is:

1. A battery protection structure comprising:
a battery disposed in a vehicle cabin;
a vehicle component disposed in the vehicle cabin to be located below the battery; and
a protective member disposed between the battery and the vehicle component,
wherein the protective member has one end fixed to a vehicle body and another end arranged between the battery and the vehicle component to be thereby cantilevered on the vehicle body,
wherein the battery comprises:
a battery cell, and
a battery case that houses the battery cell and has at least a lower surface facing the protective member,
wherein the protective member comprises:
a fixation portion formed at the one end and fixed to the vehicle body, and
a contact portion formed at the other end and configured to come into contact with the battery case when load is inputted to the protective member,
wherein a bulging portion bulging from the lower surface of the battery case toward the contact portion of the protective member is provided in a portion of the lower surface of the battery case with which the contact portion of the protective member comes into contact, and
wherein a hollow portion is formed inside the bulging portion.

2. The battery protection structure according to claim 1, wherein when load from the vehicle component is inputted to the protective member and the contact portion of the protective member comes into contact with the battery case, the contact portion of the protective member comes into contact with the bulging portion provided on the lower surface of the battery case to crush the hollow portion inside the bulging portion, and the load is thereby absorbed by the bulging portion provided on the lower surface of the battery case.

3. The battery protection structure according to claim 2, further comprising:
a reinforcement plate extending in an up-down direction in the battery case,
wherein a lower end of the reinforcement plate is close to the lower surface of the battery case, and the bulging portion has a bottom surface, and
wherein a distance between the lower end of the reinforcement plate and the bottom surface of the bulging portion is set to be greater than a distance between the lower end of the reinforcement plate and the lower surface of the battery case.

* * * * *